(12) United States Patent
Baker

(10) Patent No.: US 8,618,955 B2
(45) Date of Patent: Dec. 31, 2013

(54) PARK ASSIST SYSTEM AND METHOD

(75) Inventor: Stephen M. Baker, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 912 days.

(21) Appl. No.: 12/711,004

(22) Filed: Feb. 23, 2010

(65) Prior Publication Data

US 2011/0205088 A1 Aug. 25, 2011

(51) Int. Cl.
*B60Q 1/48* (2006.01)

(52) U.S. Cl.
USPC ............ 340/932.2; 701/45; 701/65; 348/143; 348/148

(58) Field of Classification Search
USPC ........... 340/932, 932.1, 932.2, 435, 436, 437, 340/438, 439, 995.1, 995.26; 701/45, 51, 701/65; 348/143, 148
See application file for complete search history.

(56) References Cited

U.S. PATENT DOCUMENTS

| | | | |
|---|---|---|---|
| 7,640,108 B2 * | 12/2009 | Shimizu et al. | 701/301 |
| 8,068,957 B2 * | 11/2011 | Shimizu | 701/45 |
| 8,218,007 B2 * | 7/2012 | Lee et al. | 348/148 |
| 2007/0088474 A1 * | 4/2007 | Sugiura et al. | 701/36 |
| 2009/0079828 A1 * | 3/2009 | Lee et al. | 348/148 |
| 2009/0303027 A1 * | 12/2009 | Nagamine et al. | 340/435 |
| 2010/0289631 A1 * | 11/2010 | Rao et al. | 340/435 |

* cited by examiner

*Primary Examiner* — George Bugg
*Assistant Examiner* — Edny Labbees

(57) ABSTRACT

A system and method of parking assist includes a detection device located in a rear portion of a vehicle. The detection device acquires data representative of a viewable area behind the vehicle. The detection device is in communication with a park assist controller. A first viewable area that includes an area where a tow device is located when attached to the rear portion of the vehicle is monitored, where the first viewable area is associated with a first field of view (FOV). If the tow device is detected within the first viewable area, the park assist controller switches between the first FOV to a second field of view (FOV) associated with a second viewable area, where the second viewable area does not include the area where the tow device is located. Feedback is provided to a display indicating if an obstacle is located within the second FOV.

12 Claims, 3 Drawing Sheets

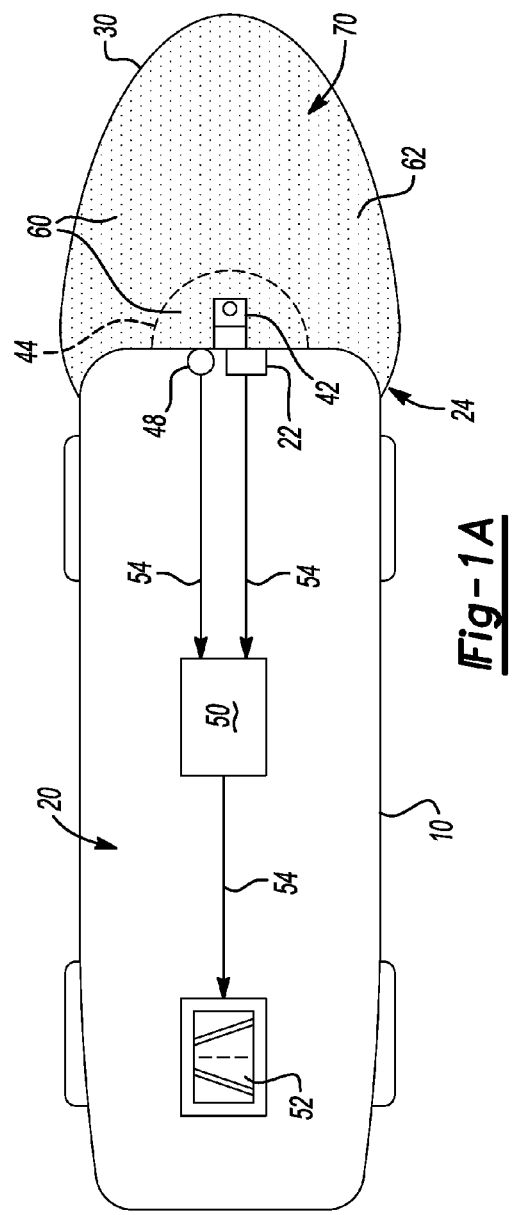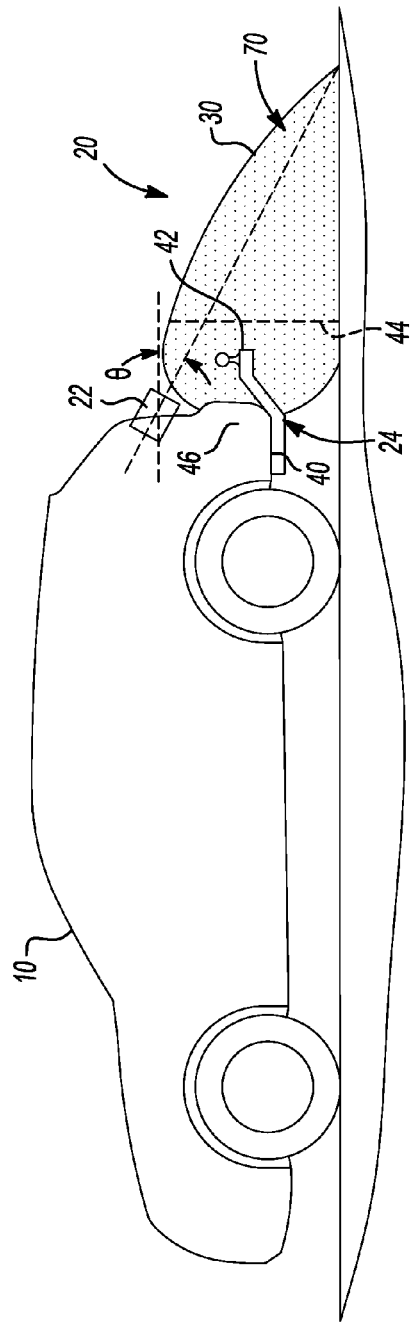

PARK ASSIST SYSTEM AND METHOD

FIELD

The present disclosure relates to a system and method for controlling a park assist system of a vehicle, and more particularly to a system and method for detecting if a tow device is attached to a rear portion of the vehicle.

BACKGROUND

The statements in this section merely provide background information related to the present disclosure and may or may not constitute prior art.

Park assist systems are used to alert a driver to obstacles located behind a vehicle. In one example, a park assist system includes an imaging device such as a camera that is mounted to a rear portion of the vehicle. The camera acquires image data that represents a viewable area behind the vehicle, which is shown on a display located near the driver's seat. The image data on the display aids the driver when backing up or parking the vehicle. Alternatively, the park assist system includes a plurality of ultrasonic sensors that monitor the viewable area behind the vehicle. The display of the park assist system has a plurality of LED lights and an audible indicator that alerts a driver if the rear part of the vehicle is too close to the obstruction located behind the vehicle.

When a tow device such as a tow hitch or bar is attached to the rear chassis of the vehicle, the viewable area of the camera or the sensors can be obstructed. If the viewable area is obstructed, the park assist system will give a false indication that an obstruction is located behind the vehicle. As a result, the park assist feature is disabled if the tow device is installed. Alternatively, instead being disabled, the park assist system may alert the driver that the viewable area is obstructed by the tow device with a special beeping or other type of tone. The driver can then manually select a setting in the vehicle that will adjust the camera or the sensors such that the tow device no longer obstructs the viewable area. However, manually selecting another setting can be an inconvenience to the driver.

While current park assist systems achieve their intended purpose, there is a need for a new and improved park assist system which exhibits improved performance from the standpoint of ease of use and convenience to the driver.

SUMMARY

The present invention provides a parking assist method for a vehicle. The vehicle includes a detection device located in a rear portion of the vehicle that acquires data representative of a viewable area behind the vehicle. The detection device is in communication with a park assist controller. The method includes the step of monitoring a first viewable area that includes an area where a tow device is located when attached to the rear portion of the vehicle, where the first viewable area is associated with a first field of view (FOV). The method further comprises the step of determining if the tow device is detected within the first viewable area. The method also includes the step of switching between the first FOV to a second field of view (FOV) associated with a second viewable area if the tow device is detected in the first viewable area by the detection device, where the park assist controller switches from the first FOV to the second FOV. The second viewable area does not include the area where the tow device is located. The method also includes the step of providing feedback to a display that indicates if an obstacle is located within the second FOV.

In an embodiment of the present invention, the method further comprises the step of storing the second FOV that is associated with the second viewable area in a memory of the park assist controller.

In another embodiment of the present invention, the method further comprises the step of calculating the second FOV that is associated with the second viewable area with the park assist controller.

In yet another embodiment of the present invention, the method further comprises the step of providing a plurality of parking assist sensors or a camera as the detection device.

In an embodiment of the present invention, the method further comprises the step of displaying the second viewable area that is associated with the second FOV on the display.

In another embodiment of the present invention, the method further comprises the step of providing a plurality of LED lights on the display. The LED lights flash when an obstacle is detected within the second FOV.

In yet another embodiment of the present invention, the method further comprises the step of providing an audible indicator with the display. The audible indicator creates a tone when an obstacle is detected within the second FOV.

In an embodiment of the present invention, the method further comprises the step of monitoring the first viewable area using a monitoring device. The monitoring device is a proximity sensor or a switch member located within an opening of a trailer hitch receiver, where the switch member indicates if a tow device is installed within the opening of the trailer hitch receiver.

In an embodiment of the present invention, a park assist system for a vehicle includes an imaging device, a display, a monitoring device, and a controller. The imaging device is located in a rear portion of the vehicle and acquires image data representative of a viewable area behind the vehicle. The monitoring device determines if a tow device is attached to the rear portion of the vehicle. The controller is in communication with the imaging device, the display, and the monitoring device. The controller has a first field of view (FOV) that is associated with image data of a first viewable area and a second field of view (FOV) that is associated with image data of a second viewable area. The first viewable area includes an area where the tow device is located when attached to the rear portion of the vehicle. The second viewable area does not include the area where the tow device is located.

The controller includes a first controller logic for monitoring the first viewable area and acquiring image data representative of the first viewable area from the imaging device. The controller also includes a second controller logic for calculating positioning data associated with the first FOV, where the positioning data produces a visual indicator on the display that guides the vehicle around an obstacle. The controller includes a third control logic for displaying image data and positioning data associated with the first FOV on the display. The controller includes a fourth control logic for determining if the tow device is detected by the monitoring device within the first viewable area. The controller includes a fifth control logic for switching from the first FOV to the second FOV if the tow device is detected within the first viewable area. The controller includes a sixth control logic for displaying image data and positioning data associated with the second FOV on the display.

In another embodiment of the present invention, the controller includes a memory for storing the second FOV that is associated with the second viewable area.

In yet another embodiment of the present invention, the controller includes a seventh control logic for calculating the second FOV that is associated with the second viewable area.

In an embodiment of the present invention, the tow device is located at about a center of a rear bumper of the vehicle.

In another embodiment of the present invention, the monitoring device is a switch member located within an opening of a trailer hitch receiver. The switch member indicates if a tow device is installed within the opening of the trailer hitch receiver.

In yet another embodiment of the present invention, the monitoring device is a proximity sensor that monitors the first FOV.

In an embodiment of the present invention, a park assist system for a vehicle includes a plurality of parking sensors, a display, a monitoring device and a controller. The plurality of parking sensors are located in a rear portion of the vehicle and acquire proximity data representative of a viewable area behind the vehicle. The monitoring device determines if a tow device is attached to the rear portion of the vehicle. The controller is in communication with the parking sensors, the display, and the monitoring device. The controller has a first field of view (FOV) that is associated with the proximity data of a first viewable area and a second field of view (FOV) that is associated with the proximity data of a second viewable area. The first viewable area includes an area where the tow device is located when attached to the rear portion of the vehicle. The second viewable area does not include the area where the tow device is located.

The controller includes a first controller logic for monitoring the first viewable area by acquiring proximity data representative of the first viewable area from the parking sensors. The controller also includes a second control logic for determining if the tow device is detected by the monitoring device within the first viewable area. The controller includes a third control logic for switching from the first FOV to the second FOV if the tow device is detected within the first viewable area. The controller includes a fourth control logic for providing feedback to the display that indicates if an obstacle is located within the second FOV.

In another embodiment of the present invention, the controller includes a memory for storing the second FOV that is associated with the second viewable area.

In yet another embodiment of the present invention, the controller includes a seventh control logic for calculating the second FOV that is associated with the second viewable area.

In an embodiment of the present invention, the tow device is located at about a center of a rear bumper of the vehicle.

In another embodiment of the present invention, the monitoring device is a switch member located within an opening of a trailer hitch receiver. The switch member indicates if a tow device is installed within the opening of the trailer hitch receiver.

In yet another embodiment of the present invention, the monitoring device is a proximity sensor that monitors the first FOV.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1A is a schematic view of an exemplary vehicle including a park assist system;

FIG. 1B is a side view of the vehicle illustrated in FIG. 1A;

DETAILED DESCRIPTION

The following description is merely exemplary in nature and is not intended to limit the present disclosure, application, or uses.

Figure 2A:
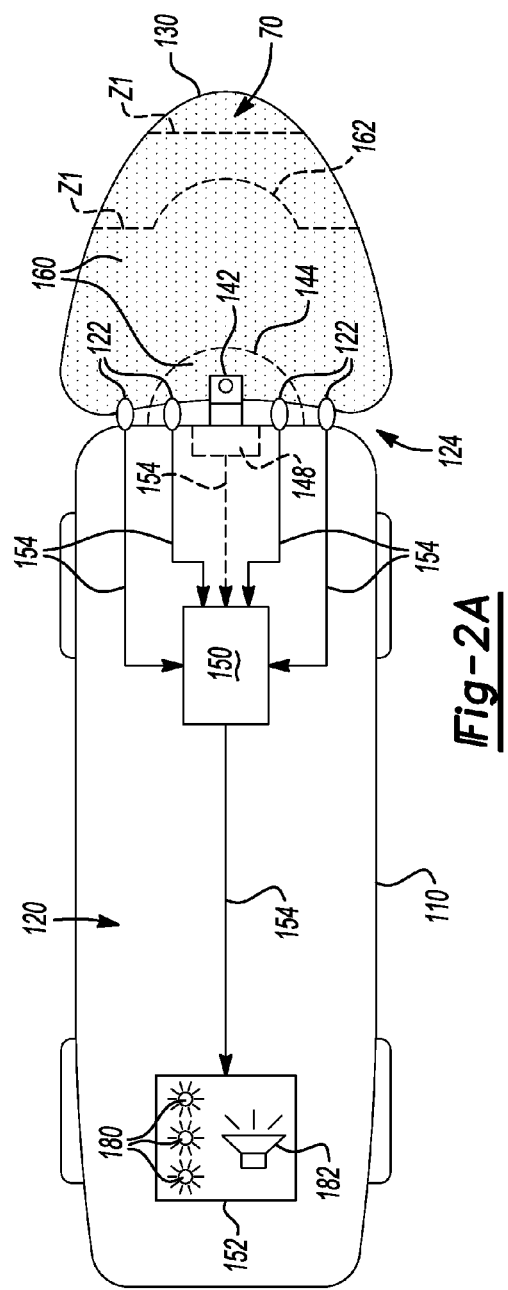
FIG. 2A is a schematic view of a vehicle including an alternative embodiment of the park assist system illustrated in FIGS. 1A-1B.
Figure 2B:
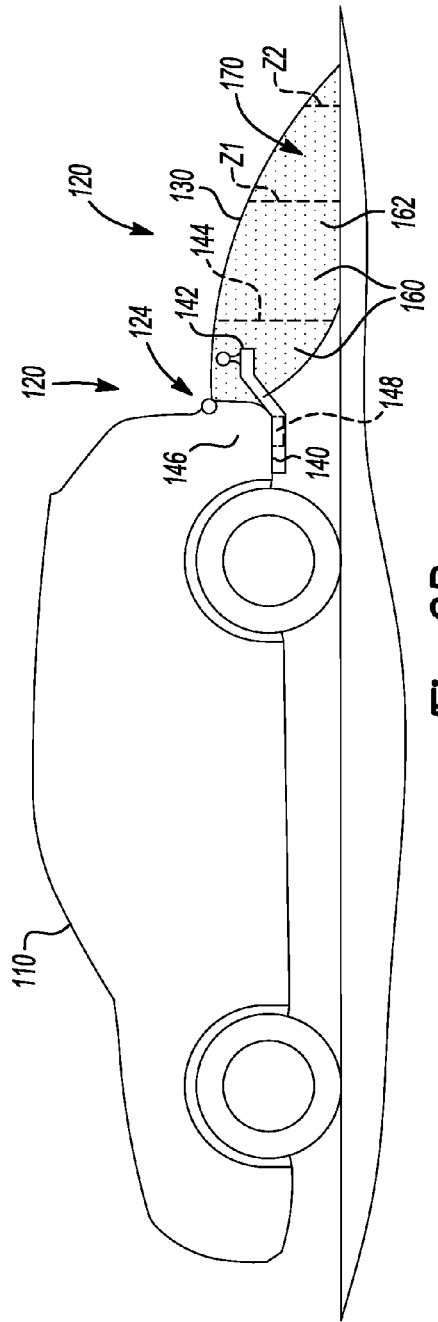
FIG. 2B is a side view of the vehicle illustrated in FIG. 2B.

With reference to FIG. 1A, a schematic view of a vehicle is generally indicated by reference number 10. The vehicle 10 includes a park assist system 20 for alerting a driver to obstacles such as a human or another vehicle located within a viewable area 30 positioned behind the vehicle 10. The park assist system 20 includes a detection device 22 that is located in a rear portion 24 of the vehicle 10. The detection device 22 is any device that acquires data representative of the viewable area 30 behind the vehicle 10. In the example as illustrated, the detection device 22 is an imaging device such as, for example, a camera, that acquires image data of the viewable area 30. Alternatively, in another embodiment of the park assist system 20 which is discussed below and is illustrated in FIGS. 2A-2B, the detection device 22 is a plurality of parking sensors.

Referring to both FIGS. 1A-1B, the detection device 22 is positioned at approximately the center of the rear portion 24 of the vehicle 10. FIG. 1B illustrates the detection device 22 affixed to the rear portion 24 of the vehicle 10 at a predetermined angle θ. In the embodiment as illustrated, the angle θ is approximately thirty degrees and is inclined in a downward direction to capture image data representative of the viewable area 30. The rear portion 24 of the vehicle 10 also includes a trailer hitch receiver 40 that selectively receives a tow device 42. The tow device 42 is any mechanism that attaches the trailer hitch receiver 40 to a trailer (not shown) such as, for example, a tow bar. The tow device 42 is positioned in a trailer area 44 that is located within the viewable area 30. The trailer area 44 is positioned approximately at the center of the rear portion 24 of the vehicle 10 and around a bumper 46 of the vehicle 10.

Referring to FIG. 1A, a monitoring device 48 is provided that determines if the tow device 42 is attached to the rear portion 24 of the vehicle 10. In the embodiment as illustrated, the monitoring device 48 is a proximity sensor such as, for example, an ultrasonic or a radar sensor. The proximity sensor is located in the rear portion 24 of the vehicle 10 and is positioned to detect the presence of the tow device 42 when placed within the trailer area 44. In an alternative embodiment, which is discussed below and is illustrated in FIGS. 2A-2B, the monitoring device 48 is a switch member that indicates if a tow device 42 is attached to the trailer hitch receiver 40.

The park assist system 20 includes a park assist controller 50 and a display 52. The park assist controller 50 regulates operation of the park assist system 20, and is preferably an electronic control device having a preprogrammed digital computer or processor, control logic, memory used to store data, and at least one I/O peripheral. The control logic includes a plurality of logic routines for monitoring, manipulating, and generating data. In the embodiment as illustrated, the display 50 is a screen such as, for example, a liquid crystal display (LCD) that electronically displays graphics like text, images, and moving pictures. The display 50 is located in an area that can be viewed by a driver such as, for example, in the center console located within an interior of the vehicle 10. The display 52 is used to show the image data acquired by the detection device 22.

The park assist controller 50 is in communication with the detection device 22, the monitoring device 48, and the display 52. A plurality of data links 54 connect the park assist controller 50 to the camera 22, the monitoring device 48, and the display 52. The data links 54 may be any type of bidirectional communication interface, such as, for example, a wireless network or data communication lines.

The detection device 22 sends image data representative of the viewable area 30 to the park assist controller 50, and the monitoring device 48 sends proximity data to the park assist controller 50 indicating if the tow device 42 is detected within the trailer area 44. The park assist controller 50 includes control logic for calculating positioning data that produces a visual indicator that guides the vehicle 10 around an obstacle, and aids a driver in manipulating the vehicle 10. The park assist controller 50 sends data including the image data received from the detection device 22 and the positioning data to the display 52 through the data links 54. In one example, the viewable area 30 behind the vehicle 10 includes a parking space. The image data collected from the detection device 22 produces an image representative of the parking space, and the positioning data produces markings that are superimposed on the image of the parking space on the display 52. The markings produced by the positioning data indicate boundaries of the parking space.

The park assist controller 50 includes a first viewable area associated with image data of a first field of view (FOV) 60, and a second viewable area associated with image data of a second field of view (FOV) 62. The FOV represents the portion of the viewable area 30 that the park assist controller 50 utilizes to alert a driver to obstacles behind the vehicle 10. The first viewable area associated with the first FOV 60 includes the trailer area 44 as well as a monitoring area 70. The monitoring area 70 is the portion of the viewable area 30 that is monitored for obstacles. The second viewable area associated with the second FOV 62 only includes the monitoring area 70, and not the trailer area 44. Specifically, the detection device 22 obtains image data representative of both the trailer area 44 as well as the monitoring area 70 until the trailer device 42 is detected within the trailer area 44. Then, the park assist controller 50 will disregard the image data from the trailer area 44 by switching to the second FOV 62.

The park assist controller 50 includes control logic for monitoring the first viewable area and acquiring image data representative of the first viewable area through the detection device 22. The park assist controller 50 also includes control logic for calculating the positioning data that provides a visual indicator that guides the vehicle 10 around an obstacle. As the trailer area 44 is monitored, the park assist controller 50 includes control logic for displaying image data and positioning data that is representative of the first FOV 60 on the display 52. The park assist controller 50 also includes control logic for detecting if the trailer device 42 is located within the first viewable area. In one embodiment, the monitoring device 48 determines if the trailer device 42 is located within the first viewable area and sends a data signal indicative of the trailer device 42 to the park assist controller 50. Alternatively, in another embodiment, the monitoring device 48 is omitted, and the park assist controller 50 includes control logic that monitors the first viewable area obtained by the detection device 22 for the presence of the trailer device 42. The park assist controller 50 also includes control logic for determining if the trailer device 42 is located within the first viewable area obtained by the detection device 22.

If the tow device 42 is detected within the trailer area 44, the park assist controller 50 switches from sending data representative of the first FOV 60 to sending data representative of the second FOV 62. In one embodiment, the second FOV 62 is stored in memory located within the park assist controller 50. Alternatively, in another embodiment, the second FOV 62 is calculated by control logic of the park assist controller 50, where the second FOV 62 is a learned value that is dynamically calculated by the park assist controller 50. That is, the monitoring area 70 is adjusted depending on the size and shape of the trailer device 42 that is placed within the trailer area 44. Once the second FOV 62 is either learned or loaded from memory in the park assist controller 50, image data as well as positioning data associated with the second FOV 62 is shown on the display 52. Thus, unlike conventional park assist systems, the park assist system 20 automatically switches between the first FOV 60 to the second FOV 62 if a tow device 42 is attached to the trailer hitch receiver 40.

FIGS. 2A-2B are an illustration of an alternative embodiment of a park assist system 120 that includes a plurality of parking sensors 122 located on a rear portion 124 of a vehicle 110. The parking sensors are any type of proximity sensor that can detect the presence of a tow device 142 located within a trailer area 144 of a viewable area 130, such as, for example, ultrasonic sensors. In the embodiment as illustrated, four parking sensors 122 are spaced along a bumper 146 of the vehicle 110, however it is understood that any number of parking sensors 122 may be used as well.

A trailer hitch receiver 140 and a monitoring device 148 are provided, where the trailer hitch receiver 140 selectively receives the tow device 142. The monitoring device 148 determines if the tow device 142 is attached to the rear portion 124 of the vehicle 110. In the embodiment as illustrated, the monitoring device 148 is a switch member located in an opening (not shown) of the trailer hitch receiver 140. The switch member determines if the tow device 142 is inserted within the opening of the trailer hitch receiver 140, and sends data indicating if the tow device 142 is engaged to the trailer hitch receiver 140 to a park assist controller 150.

The park assist controller 150 regulates operation of the park assist system 120, and is in communication with a display 152 and the parking sensors 122 by a plurality of data links 154. In the embodiment as illustrated, the display 152 includes a plurality of LED lights 180 as well as an audible indicator 182. The parking sensors 122 send proximity data representative of the viewable area 130 to the park assist controller 150, where the proximity data indicates if an obstacle is located in the viewable area 130. If an obstacle is detected by the parking sensors 122, the LED lights 180 will flash and the audible indicator 182 will create a tone.

The park assist controller 150 includes a first viewable area associated with proximity data of a first field of view (FOV) 160, and a second viewable area associated with image data of a second field of view (FOV) 162. The first viewable area associated with the first FOV 160 includes the trailer area 144 as well as a monitoring area 170. The monitoring area 170 is the portion of the viewable area 130 that is monitored for obstacles. The second viewable area associated with the second FOV 162 only includes the monitoring area 170, and not the trailer area 144.

In one embodiment, the monitoring area 170 includes different zones that will alert a driver to an oncoming obstacle. The monitoring area 170 includes a first warning zone Z1 and a second warning zone Z2. The first warning zone Z1 and the second warning zone Z2 each emit different types of warnings to the driver. The vehicle 110 will first approach the second warning zone Z2. If an obstacle is located within the second warning zone Z2, the display 152 will provide a first alert to the driver indicating that the rear portion 124 of the vehicle 110 is approaching an object. For example, the LED lights 180 will flash and the audible indicator 182 will create a tone indicating an obstacle is located within the second warning zone Z2. When the obstacle enters the first warning zone Z1, the LED lights 180 will flash and the audible indicator 182 will beep at a higher frequency. Alternatively, the LED lights 180 illuminate continuously and the audible indicator 182 produces a continuous tone. This signals the driver to stop the vehicle 110.

The park assist controller 150 includes control logic for monitoring the first viewable area by acquiring proximity data representative of the first viewable area from the parking sensors. The park assist controller 150 also includes control logic for determining if the tow device 142 is detected within the trailer area 144 by receiving data from the monitoring device 148 through the data link 154. Alternatively, in another embodiment of the park assist system 120, the monitoring device 148 is omitted, and the park assist controller 150 includes control logic for determining if the tow device 142 is located within the first viewable area through the proximity data acquired from the parking sensors. If the tow device 142 is engaged within the opening of the trailer area 144, the park assist controller 150 switches from the first FOV 160 to the second FOV 162. Once the second FOV 162 is either learned or loaded from memory in the park assist controller 150, the park assist controller 150 will provide feedback that indicates if an obstacle is located within the second FOV 162. For example, the LED lights 180 will flash and the audible indicator 182 will create a beeping noise.

Figure 3:
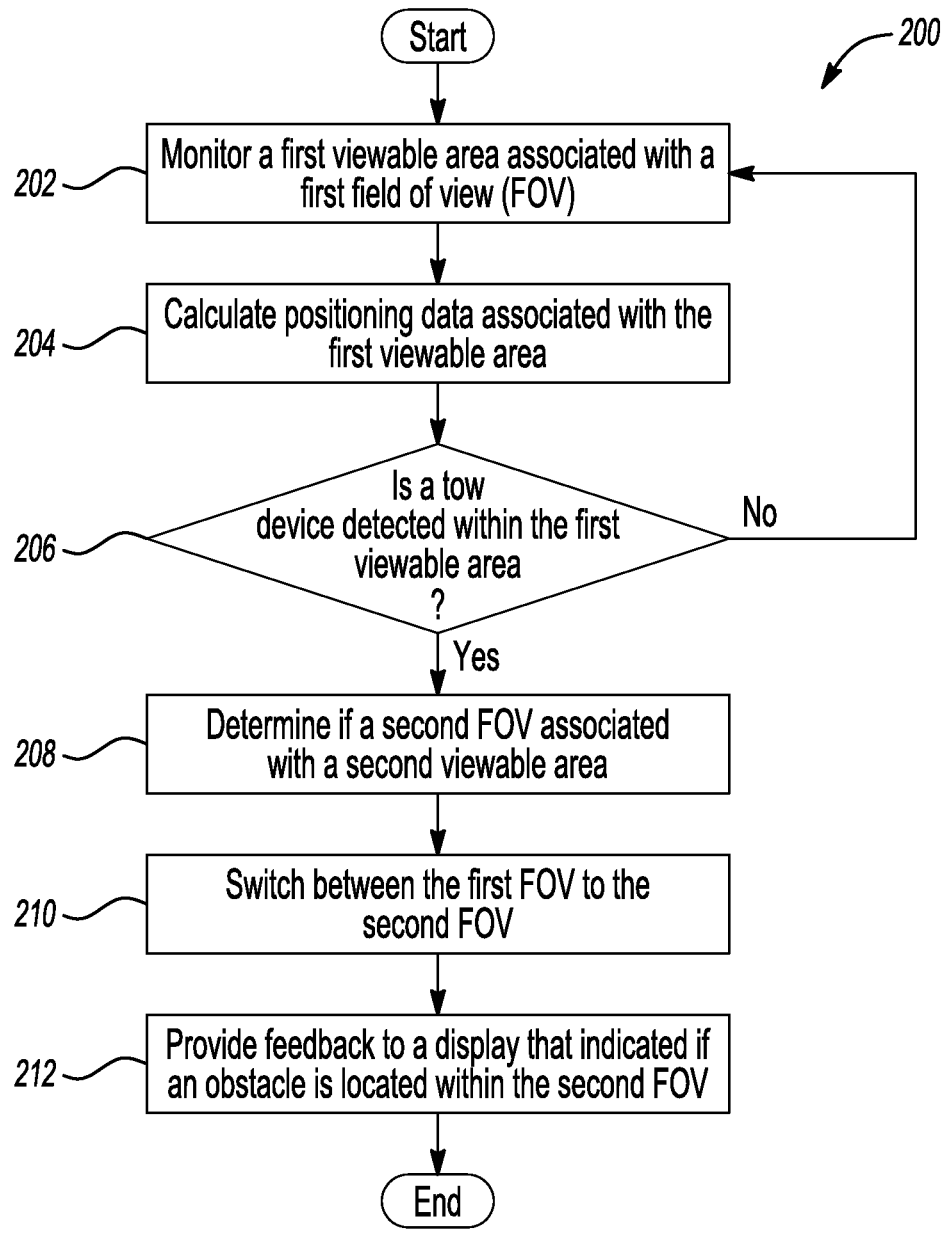
FIG. 3 is a flow diagram illustrating a park assist process.

Turning now to FIG. 3, and with continued reference to FIGS. 1A-2B, a parking assist method is generally indicated by reference number 200. The method 200 begins at step 202 where the park assist controller 50 or 150 includes control logic for monitoring the first viewable area by acquiring data representative of the first viewable area through the detection device 22 or 122. The first viewable area is associated with the first FOV 60 or 160, and includes the trailer area 44 or 144 as well as the monitoring area 70 or 170. In the embodiment as illustrated in FIGS. 1A-1B, the detection device 22 is illustrated as an imaging device that is a camera mounted to the rear portion 24 of the vehicle 10. In the alternative embodiment as illustrated in FIGS. 2A-2B, the first viewable area is monitored using parking sensors as the detection device 122. The method 200 then proceeds to step 204.

In step 204, the park assist controller 50 includes control logic for calculating positioning data that is associated with the first FOV 60. It should be noted that step 204 applies to the embodiment of the park assist system 20 that is illustrated in FIGS. 1A-1B, where positioning data is calculated by the park assist controller 50. The imaging data and the positioning data associated with the first FOV 60 are shown on the display 52.

The positioning data produces a visual indicator that guides the vehicle 20 around an obstacle located within the first FOV 60. For example, an image of a parking space obtained from the camera is shown on the display 52, where the positioning data produces markings that are superimposed on the image of the parking space. The markings produced by the positioning data indicate boundaries of the parking space. The method then proceeds to step 206.

In step 206, the park assist controller 50 or 150 includes control logic for determining if the tow device 42 or 142 is detected within the first viewable area. The tow device 42 or 142 is attached to the rear portion 24 or 124 of the vehicle by the trailer hitch receiver 40 or 140. In one embodiment, the park assist controller 50 or 150 includes control logic that automatically determines if the trailer device 42 or 142 is located within the first viewable area by monitoring the first viewable area with the detection device 22 or 122. Alternatively, the monitoring device 48 or 148 is included to determine if the tow device 42 or 142 is attached to the rear portion 24 or 124 of the vehicle 10 or 110. For example, FIGS. 1A-1B illustrates the monitoring device 48 as a proximity sensor. Alternatively, in another embodiment as illustrated in FIGS. 2A-2B, the monitoring device 148 is a switch member.

If a tow device 42 or 142 is not detected within the first viewable area, then the method 200 returns to step 202, where the first viewable area continues to be monitored. However, if the tow device 42 or 142 is detected within the first viewable area, the method 200 can proceed to step 208.

In step 208, the park assist controller 50 or 150 includes control logic for determining the second FOV 62 or 162 associated with the second viewable area. The second viewable area associated with the second FOV 62 or 162 only includes the monitoring area 70 or 170, and not the trailer area 44 or 144. The second FOV 62 or 162 can either be stored in memory of the park assist controller 50 or 150, or is calculated by control logic of the park assist controller 50 or 150. In one embodiment, the second FOV 62 or 162 is a learned value that is dynamically calculated by the park assist controller 50 or 150, where the monitoring area 70 or 170 is dynamically adjusted depending on the size and shape of the trailer device 42 or 142. Once the second FOV 62 or 162 is either loaded from memory or calculated by the park assist controller 50 or 150, the method 200 proceeds to step 210.

In step 210, the park assist controller 50 or 150 includes control logic for switching between the first FOV 60 or 160 to the second FOV 62 or 162 if the tow device 42 or 142 is detected within the first viewable area. The park assist controller 50 or 150 normally sends data representative of the first FOV 60 or 160 to the display 50 or 150 until the tow device 42 or 142 is detected within the trailer area 44 or 144. Then the park assist controller 50 or 150 switches from sending data representative of the first FOV 60 or 160 to sending data representative of the second FOV 62 or 162. Method 200 may then proceed to step 212.

In step 212, the park assist controller 50 or 150 includes control logic for providing feedback to the display 52 that indicated if an obstacle is located within the second viewable area associated with the second FOV 62 or 162. In the embodiment as illustrated in FIGS. 1A-1B, the display 52 is a screen such as, for example, an LCD screen that displays the image data acquired by the detection device 22. The display 52 also shows the positioning data that is calculated by the park assist controller 50 that is associated with the second FOV 62. Alternatively, in the embodiment as illustrated in FIGS. 2A-2B, the display 152 includes the LED lights 180 and the audible indicator 182. If an obstacle is detected by the parking sensors 122, the park assist controller 150 will send data to the display 152 causing the LED lights 180 to flash and the audible indicator 182 to create a tone indicating an obstacle is located within the second FOV 162. Method 200 may then terminate.

Some types of conventional park assist system will give a false indication that an obstruction is located behind the vehicle, or alert the driver that the viewable area is obstructed by the tow device with a special beeping or other type of tone if the tow device is attached. Unlike conventional park assist systems, the park assist system 20 or 120 automatically switches between the first FOV 60 or 160 to the second FOV 62 or 162 if a tow device 42 or 142 is attached to the trailer hitch receiver 40 or 140. The ability to automatically switch between the first and second FOVs can increase convenience to a driver and make the park assist system 20 or 120 easier to use.

The description of the invention is merely exemplary in nature and variations that do not depart from the gist of the invention are intended to be within the scope of the invention. Such variations are not to be regarded as a departure from the spirit and scope of the invention.

What is claimed is:

1. A park assist system for a vehicle, comprising:
    an imaging device located in a rear portion of the vehicle that acquires image data representative of a viewable area behind the vehicle;
    a display;
    a monitoring device that determines if a tow device is attached to the rear portion of the vehicle; and
    a controller in communication with the imaging device, the display, and the monitoring device, wherein the controller has a first field of view (FOV) that is associated with image data of a first viewable area and a second field of view (FOV) that is associated with image data of a second viewable area, and wherein the first viewable area includes an area where the tow device is located when attached to the rear portion of the vehicle, and wherein the second viewable area does not include the area where the tow device is located, wherein the controller includes:
        a first controller logic for monitoring the first viewable area and acquiring image data representative of the first viewable area by the imaging device;
        a second controller logic for calculating positioning data associated with the first FOV, wherein the positioning data produces a visual indicator on the display that guides the vehicle around an obstacle;
        a third control logic for displaying image data and positioning data associated with the first FOV on the display;
        a fourth control logic for determining if the tow device is detected by the monitoring device within the first viewable area;
        a fifth control logic for switching from the first FOV to the second FOV if the tow device is detected within the first viewable area; and
        a sixth control logic for displaying image data and positioning data associated with the second FOV on the display.

2. The park assist system of claim 1 wherein the controller includes a memory for storing the second FOV that is associated with the second viewable area.

3. The park assist system of claim 1 wherein the controller includes a seventh control logic for calculating the second FOV that is associated with the second viewable area.

4. The park assist system of claim 1 wherein the tow device is located at about a center of a rear bumper of the vehicle.

5. The park assist system of claim 1 wherein the monitoring device is a switch member located within an opening of a trailer hitch receiver, wherein the switch member indicates if a tow device is installed within the opening of the trailer hitch receiver.

6. The park assist system of claim 1 wherein the monitoring device is a proximity sensor that monitors the first FOV.

7. A park assist system for a vehicle, comprising:
    a plurality of parking sensors located in a rear portion of the vehicle that acquire proximity data representative of a viewable area behind the vehicle;
    a display;
    a monitoring device that determines if a tow device is attached to the rear portion of the vehicle; and
    a controller in communication with the parking sensors, the display, and the monitoring device, wherein the controller has a first field of view (FOV) that is associated with the proximity data of a first viewable area and a second field of view (FOV) that is associated with the proximity data of a second viewable area, and wherein the first viewable area includes an area where the tow device is located when attached to the rear portion of the vehicle, and wherein the second viewable area does not include the area where the tow device is located, wherein the controller includes:
        a first controller logic for monitoring the first viewable area by acquiring proximity data representative of the first viewable area from the parking sensors;
        a second control logic for determining if the tow device is detected by the monitoring device within the first viewable area;
        a third control logic for switching from the first FOV to the second FOV if the tow device is detected within the first viewable area; and
        a fourth control logic for providing feedback to the display that indicates if an obstacle is located within the second FOV.

8. The park assist system of claim 7 wherein the controller includes a memory for storing the second FOV that is associated with the second viewable area.

9. The park assist system of claim 7 wherein the controller includes a seventh control logic for calculating the second FOV that is associated with the second viewable area.

10. The park assist system of claim 7 wherein the tow device is located at about a center of a rear bumper of the vehicle.

11. The park assist system of claim 7 wherein the monitoring device is a switch member located within an opening of a trailer hitch receiver, wherein the switch member indicates if a tow device is installed within the opening of the trailer hitch receiver.

12. The park assist system of claim 7 wherein the monitoring device is a proximity sensor that monitors the first FOV.

* * * * *